United States Patent

Dreckmann et al.

[15] 3,696,290
[45] Oct. 3, 1972

[54] MAGNETIC NON-CONTACT THICKNESS GAUGE WITH MEANS TO COMPENSATE THE EFFECTS OF STRAY FIELDS ON THE GAUGE

[72] Inventors: Hubert Dreckmann; Charles B. Wilson; Richard K. Wagenblast, all of St. Petersburgh, Fla.

[73] Assignee: The Hays Corporation, Michigan City, Ind.

[22] Filed: July 22, 1970

[21] Appl. No.: 57,087

[52] U.S. Cl. ............... 324/34 TK, 324/46, 338/32 R
[51] Int. Cl. ............................................. G01r 33/12
[58] Field of Search ..... 324/34 TR, 46, 45; 338/32 R, 338/32 H; 323/94 H

[56] References Cited

UNITED STATES PATENTS

| | | |
|---|---|---|
| 3,146,317 | 8/1964 | Kuhrt et al. ............. 338/32 H |
| 3,192,471 | 6/1965 | Kuhrt et al. ............. 338/32 H |
| 2,603,001 | 7/1952 | Fox et al. ............... 324/34 TK |
| 2,712,601 | 7/1955 | Reinwald ................ 324/34 R |
| 2,997,648 | 8/1961 | Bozorth .................. 324/46 |
| 3,152,303 | 10/1964 | Lary et al. ............... 324/40 |
| 3,528,002 | 9/1970 | Dunlavey ............... 324/34 TK |

Primary Examiner—Robert J. Corcoran
Attorney—Oltsch & Knoblock

[57] ABSTRACT

A thickness measuring device wherein means are positioned at opposite sides of and in selected spacing relative to a work piece being measured and respectively include magnet responsive means supported by one positioning means and a magnet supported by the other positioning means, said magnet and magnet responsive means defining a flux circuit intercepted by said work piece. The magnet responsive means include spaced parts and a third relatively small part between said spaced parts at which flux in said circuit is concentrated. A flux sensitive resistor is positioned to respond to flux variations at said third part and is connected in a Wheatstone bridge meaSuring circuit which indicates variations in the thickness of the work piece.

Temperature control means including a heater and sensor means compensate for temperature variations acting on the magnetic parts, said sensor means being connected in another Wheatstone bridge measuring circuit. The sensor means may include cooperating sensors located respectively adjacent to the work piece and adjacent to the heater.

10 Claims, 12 Drawing Figures

INVENTORS
HUBERT DRECKMANN,
CHARLES B. WILSON &
BY RICHARD K. WAGENBLAST

ATTORNEYS

INVENTORS
HUBERT DRECKMANN,
CHARLES B. WILSON &
BY RICHARD K. WAGENBLAST

ATTORNEYS

INVENTORS
HUBERT DRECKMANN,
CHARLES B. WILSON &
BY RICHARD K. WAGENBLAST

ATTORNEYS

MAGNETIC NON-CONTACT THICKNESS GAUGE WITH MEANS TO COMPENSATE THE EFFECTS OF STRAY FIELDS ON THE GAUGE

This invention relates to improvements in thickness measuring devices by means of which the thickness of a large or wide sheet, web or plate of substantial width can be measured accurately at any selected portion thereof.

This invention is particularly related to devices of the general type and character shown in U. S. Pat. No. 3,164,981, dated Jan. 12, 1965, wherein work followers having nozzles and associated pneumatic means are positioned at opposite faces of a work piece in selected pneumatically balanced positions relative to the opposite faces of the work. The work followers mount magnetic means anchored to the nozzles to move therewith incident to variations in the thickness of the work. In prior devices variations in work thickness have been measured and indicated by pneumatic means.

Devices of this character operate accurately, but are subject to certain limitations because of the characteristics and limitations of the pneumatic gauge means. Among such limitations are lack of sensitivity and low speed of response to variations in magnetic flux which is a function of the thickness of the work being measured. Another limitation of prior devices occurs in the event of lateral displacement of the opposed magnetic elements in a direction parallel to the plane of the sheet of work. Another limitation of devices with pneumatic gauging means is inability thereof to compensate for changes in temperature of the load or work piece, or of ambient temperature.

It is a primary object of this invention to provide a thickness measuring device in which resistors sensitive to magnetic flux variations in the magnetic circuit of the device control an electrical measuring circuit to indicate variations in thickness of a work piece.

A further object is to provide a device of this character wherein a permanent magnet is associated with a work follower located at one side of a work piece and magnet responsive means are associated with the work follower at the opposite side of the work piece and include a magnetic flux concentrator with which a flux sensitive resistor is associated.

A further object is to provide a device of this character having magnet responsive means with temperature control means responsive to and compensating for temperature variations at said magnet responsive means.

A further object is to provide a device of this character wherein means for controlling temperature utilize and respond to temperature-responsive sensors associated respectively with a temperature-compensating heater and with ambient temperature of the work piece being measured.

Other objects will be apparent from the following specification.

This invention utilizes work followers located at opposite faces of the work piece to be measured, each of which includes a pneumatically balanced or positioned jet or nozzle for directing air against the work piece. Magnetic flux-generating means is carried by one follower. Magnet responsive means, such as iron pole pieces, are carried by the opposite follower and move therewith. Magnetic flux-concentrating means are utilized in the magnet responsive means in association with flux-sensitive electrical elements connected in an electrical measuring circuit in a manner to indicate variations in thickness of the work piece being measured. The device further contemplates or includes means responsive to temperature changes to compensate the electrical measuring means for the occurrence of such temperature changes.

Figure 1:
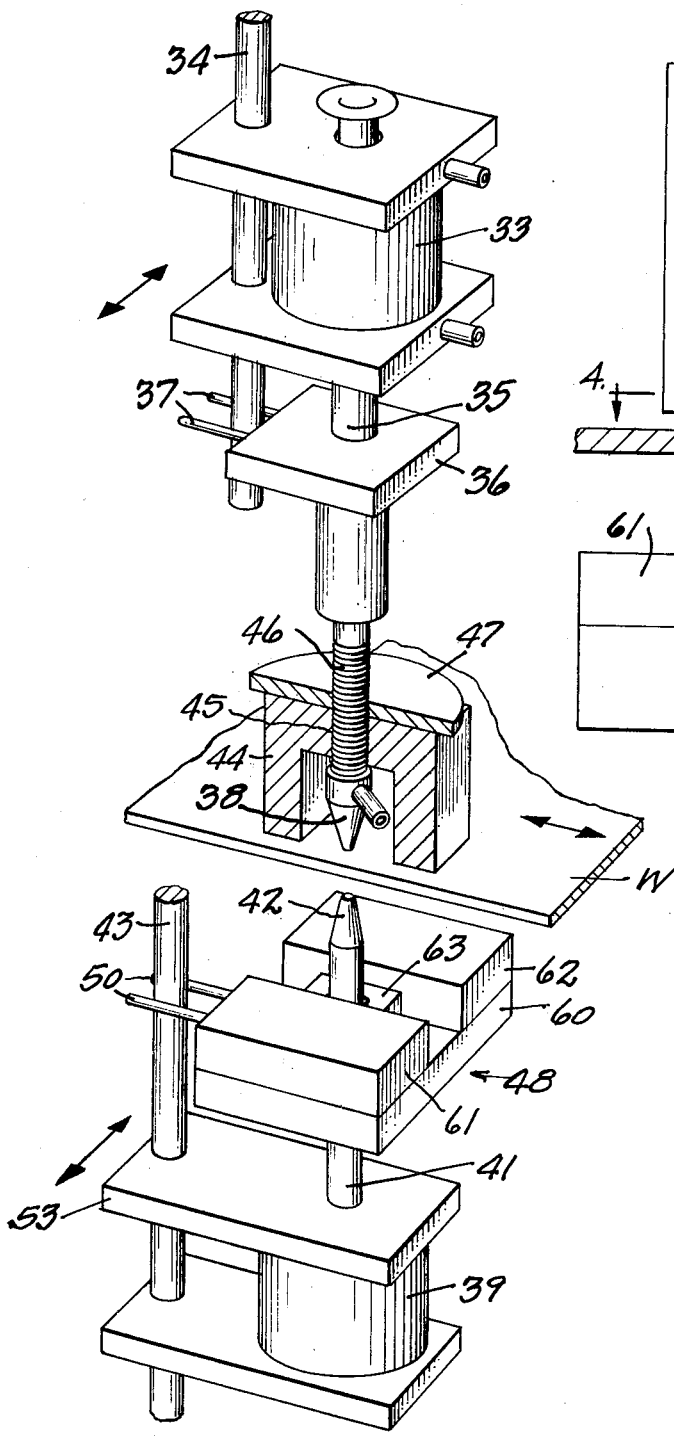
FIG. 1 is a perspective view of apparatus embodying our invention, with parts broken away.

Referring to the drawings, and particularly to FIG. 1 which illustrates the general arrangement of the parts of the device, the sheet, web or other work piece W may travel in the direction of the arrows along a selected path. The device employs a pair of work-follower means positioned opposite one another relative to the work: for example, positioned above and below the work as illustrated. The upper and lower work-followers are suitably mounted upon means (not shown) for conjoint movement transversely of the work W, as upon transverse track means parallel to each other and to the work and spanning the work.

The upper work-follower means has a double-acting pneumatic cylinder 33 supported by means of a post 34 to be movable upon the transverse track or support means. A piston rod 35 extends through the bottom wall of the cylinder 33 and has mounted thereon a block 36 containing a pair of parallel, spaced apart pins 37 extending laterally outwardly therefrom. Pins 37 are arranged and adapted to straddle the lower portion of post 34 and thereby to prevent the piston rod 35 from rotating with respect to the cylinder 33. A pneumatic gauge nozzle 38 is mounted at the lower end of piston rod 35 and is connected to a source of air or gas under pressure (not shown) and is arranged to exhaust against the work W, as at the top face thereof. The pneumatic cylinder 33 is preferably connected to the same source of air or gas pressure which supplies the nozzle 38. The upper work-follower means moves along the track by operating means (not shown) and the nozzle 38 is spaced a uniform distance from the face of the work W, as from the top face thereof.

The lower work-follower means comprises a double-acting pneumatic cylinder 39, a piston assembly 41, and an air gauge nozzle 42, arranged opposite nozzle 38. The lower follower means is supported by post 43 from a second supporting means or track spanning the work W and parallel to the track or means which supports the opposite or upper follower means. The cylinder 39 and nozzle 42 of the lower or second pneumatic unit are supplied by a common source of gas or air under pressure, and preferably the same source which supplies the opposite or upper pneumatic unit. The upper and lower cylinders 33 and 39 and the upper and lower nozzles 38 and 42 are preferably similar, so that equal or similar jets of air or gas are directed by the respective nozzles against the opposite faces of the work piece. The lower work-follower means is moved along its track or rail by suitable means (not shown) simultaneously and equal to the movement of the upper unit so that the nozzles for the two units remain at a substantially uniform distance from the faces of the work W and in opposed or aligned relation to each other.

A magnet 44 is adjustably mounted, poles down, in the embodiment shown, on and for movement with one of the work-follower means, herein shown as the upper follower means. The magnet 44 is preferably a permanent magnet with a vertical threaded passage 45 adapted to receive a correspondingly threaded shank portion 46 of the piston rod 35. The magnet 44 is screwed onto rod 35 for vertical movement therewith, and its position thereon is adjustably fixed, as by means of a lock nut 47, also screwed onto rod 35 above the magnet. The adjustment of the magnet 44 on the rod 35 controls the zero setting of the apparatus.

A magnetically responsive member 48 is mounted on and for movement with the work-follower means opposite that which carries the magnet 44, and is here shown as the lower work-follower means. Magnetically responsive member 48 is anchored to and moves vertically with the associated nozzle, here shown as the nozzle 42. A pair of pins 50 protrude from the part 53 and straddle the post 43 to prevent rotation of the piston rod 41. The magnetically responsive member 48 is provided also with a threaded passage 54 which receives the nozzle 42 so that the magnetically responsive member 48 may be adjusted vertically relative to the nozzle.

In the operation of the device, the upper nozzle 38 and magnet 44 follow the top face of the work, while the lower nozzle 42 follows the bottom face thereof. The magnet 44 and its responsive member 48 are separated by a gap varying as the thickness of the work W varies. The dimension of the gap varies the intensity of the magnetic field between magnet 44 and member 48. Accordingly, as the thickness of the work W changes, the flux in member 48 changes proportionally.

It will be obvious that the arrangement of the parts can be transposed by mounting the magnet 44 upon the upper work-follower means and mounting the magnetically responsive member 48 upon the opposite or lower follower means. The relative movement of the two will still reflect only actual changes in the thickness or surface position of the work W. It will also be apparent that the sensitivity of the apparatus can be varied by loosening the lock nut 47 and shifting the magnet 44 on its piston rod 35. Also sensitivity adjustment is possible by varying the air pressure supplied to the respective air gauge nozzles 38 and 42.

Figure 2:
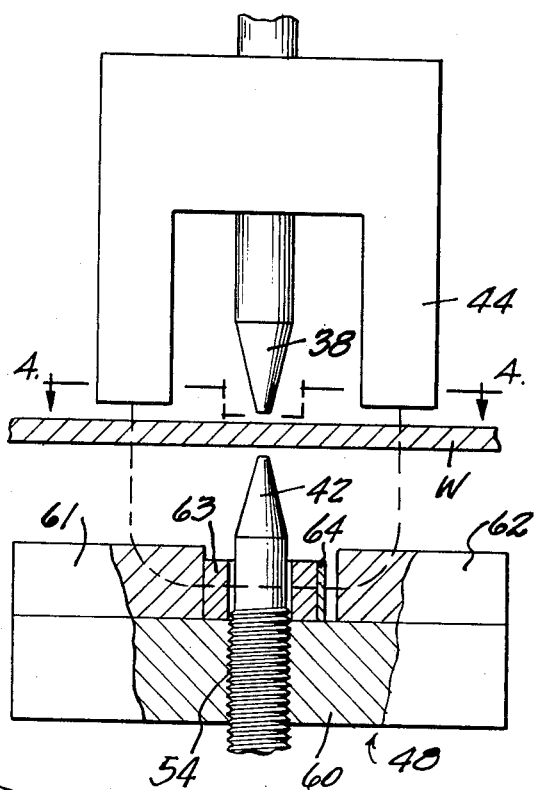
FIG. 2 is an enlarged fragmentary sectional view of the device.
Figure 4:
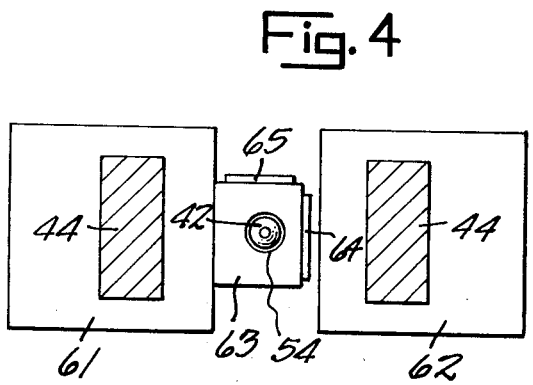
FIG. 4 is a sectional view taken on line 4—4 of FIG. 2.

In the present device, the means for measuring, recording or indicating the thickness of the work W is electrical and responds to variations in the magnetic flux in the flux path defined by the magnet 44 and the magnetically responsive member 48 and intercepted by the work W. For this purpose, the construction of the magnetically responsive member 48 is preferably of the character illustrated in FIGS. 1 and 2 wherein an aluminum or other non-magnetic member 60 supports a pair of spaced iron pole pieces 61–62. The iron pole pieces 61–62 have their upper faces parallel to the plane of the pole faces of the magnet 44 and of the intervening work W, and each is preferably of an area substantially greater than the area of the magnet pole which each confronts, as shown in FIG. 4. Thus, if small changes in the relative positions of the magnet 44 and the pole pieces 61, 62 occur in planes parallel to the work W, the flux in the gap between the magnet 44 and the pole pieces, 61,62 will not change to create a scanning error that is not related to the thickness of the work W. A small block 63 of iron or other magnetically susceptible material is positioned in the space between the iron pole pieces 61 and 62, preferably in contact with one thereof, such as pole piece 61, and spaced a slight distance from the opposite pole piece, such as 62. The block 63 constitutes a flux concentrator of small size compared to the iron pole pieces 61,62 and provides a flux path between the pole pieces 61 and 62. Block 63 preferably has aperture 54 therein.

A resistor 64 is preferably positioned in the gap between block 63 and pole piece 62, and is preferably carried by the block 63. This resistor may be of any desired character which responds to or whose resistance varies with variations in the magnetic flux in the magnetic circuit, that is, to the flux flowing between block 63 and pole piece 62.

It is not required that the parts be so arranged that the nozzle 42 extends through aperture 54 in the block 63. Instead the block 63 may be positioned alongside the nozzle 42. In such arrangements, the block 63 preferably will be located in a direction from the nozzle 42 opposite the direction of movement of the work W relative to the nozzle 42. In such instances, the space between the iron pole pieces 61,62 will preferably extend parallel to the direction of travel of the work W.

The magnetic flux-sensitive resistor is usually temperature sensitive. Thus, a temperature-compensating resistor 65 is preferably positioned adjacent to the flux concentrator block 63.

Figure 3:
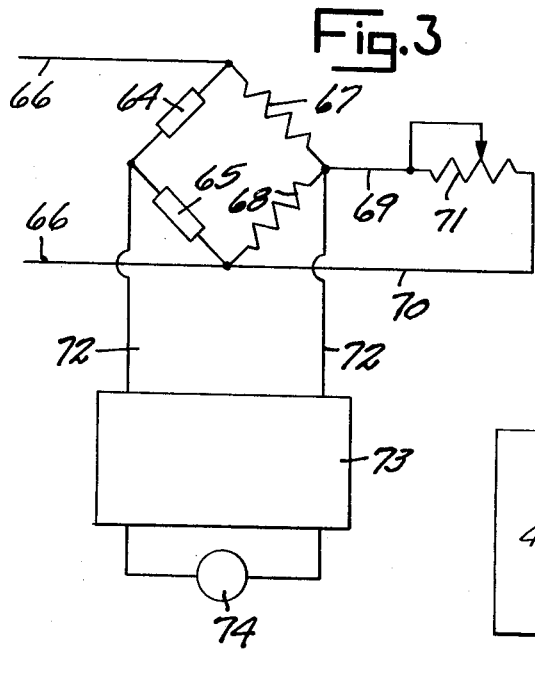
FIG. 3 is a wiring diagram of the device.

For purposes of measurement, the flux-sensitive resistor 64 and the temperature-compensating resistor 65 are connected in a Wheatstone bridge circuit of the character illustrated in FIG. 3. In this circuit, resistors 64 and 65 are connected in two legs of the Wheatstone bridge across the supply lines 66. The two opposite legs of the bridge are composed of fixed resistors 67 and 68. A zeroing network is connected with the bridge, and preferably includes lead 69 connected to the bridge circuit between resistors 67 and 68, and lead 70 connected to the bridge circuit between resistors 65 and 68. An adjustable resistor 71 connected to leads 69 and 70 completes the zeroing network. The output signal from the Wheatstone bridge is delivered by leads 72 to an amplifier 73 to which a suitable gauge or meter 74 is connected.

In the present device, the greatest reluctance in the magnetic circuit is at the gaps between the magnet 44 and the pole pieces 61 and 62. The extent of these gaps depends upon the separation of the magnet from the pole pieces, which separation is a function of and proportional to sheet thickness. Therefore, the magnetic flux passing through the pole pieces and the flux concentrator 63 is a function of sheet thickness. Variations in the magnetic flux at the flux concentrator block 63 are detected by the magnetic flux-sensitive resistor 64. As the resistance of the resistor 64 varies, the variations are detected in the Wheatstone bridge circuit, with the output in lead 72 from the circuit being amplified at 73 and indicated at 74 in terms of work thickness variations.

The expedient of using the flux concentrator 63 of small size relative to the sizes of the iron pole pieces 61 and 62 results in flux concentration in a small zone or area in the magnetic circuit. The positioning of the flux-sensitive resistor 64 in this small area or zone of magnetic flux concentration insures that the resistor will be highly responsive to small changes in magnetic flux in the magnetic circuit, and hence fully responsive to small increments of movement responsive to or sensing variations in thickness of the work W.

Thickness measuring devices of the character described utilizing a circuit, as illustrated in FIG. 3, commonly entail a positioning of components as illustrated schematically in FIG. 4. The magnetic flux-sensitive resistor is usually temperature sensitive. Consequently, a temperature control system is preferred for the purpose of maintaining the armature 61, 62, 63 at a substantially constant temperature.

Figure 5:
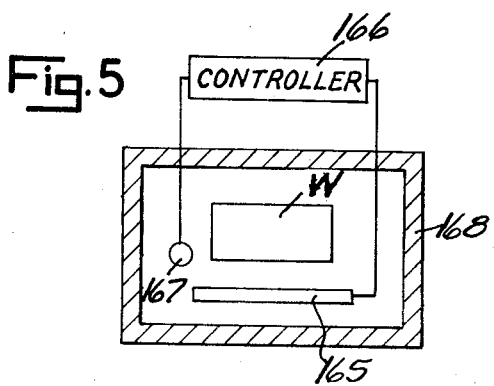
FIG. 5 is a schematic view of one embodiment of temperature compensating means used in the device.

A modified embodiment of the invention is shown in FIG. 5 and utilizes a resistance heater 165 which compensates for temperature variations of the work W in response to a controller 166 in turn controlled by a sensor 167. The sensor, the work and the heater are usually confined in a small area, the effect of which is equivalent to insulation 168, as illustrated schematically in FIG. 5. Systems of this character are close-grouped in order to minimize undesired changes of temperature of the magnetic armature or responsive means incident to load change or responsive to a change in ambient temperature. However, such close grouping of the parts does not always eliminate these disadvantages. Thus, in some instances, if the sensor 167 is located close to the heater 165, a load change, that is a change in the ambient temperature or of the parts resulting from a change in the temperature of the work W, may cause a load change, as illustrated at A in FIG. 6. Such changes are detrimental and lead to the possibility of inaccuracies of measurement and indication. If, on the other hand, the sensor 167 is located close to the work W and more distant from the heater 165, long delay times between the heater and sensor response can cause a temperature pattern on the load, as shown at B in FIG. 6. The optimum operating condition which is sought is illustrated at C in FIG. 6.

Figure 7:
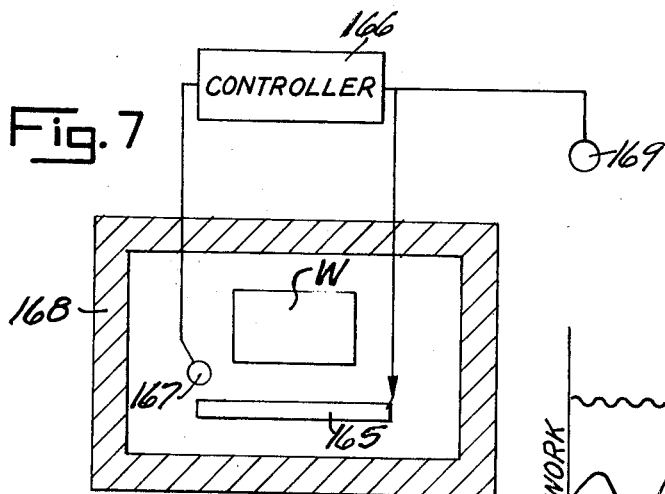
FIG. 7 is a schematic view of another embodiment of temperature compensating means.
Figure 6:
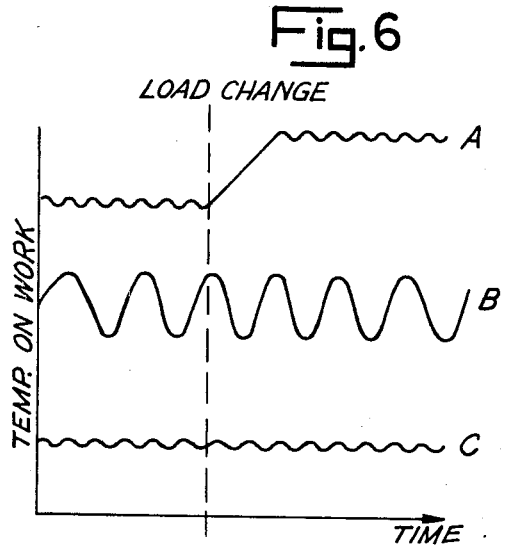
FIG. 6 is a graph illustrating various operating conditions of the device.

In order to insure an operating condition as illustrated at C in FIG. 6, an arrangement as illustrated schematically in FIG. 7 may be utilized. In this arrangement, sensor 167 is located in close proximity to the heater 165. A second sensor 169 is located to be thermally coupled to the ambient temperature, for example to the temperature of the work W. Controller 166 is connected to respond to both of the sensors 167 and 169.

Figure 8:
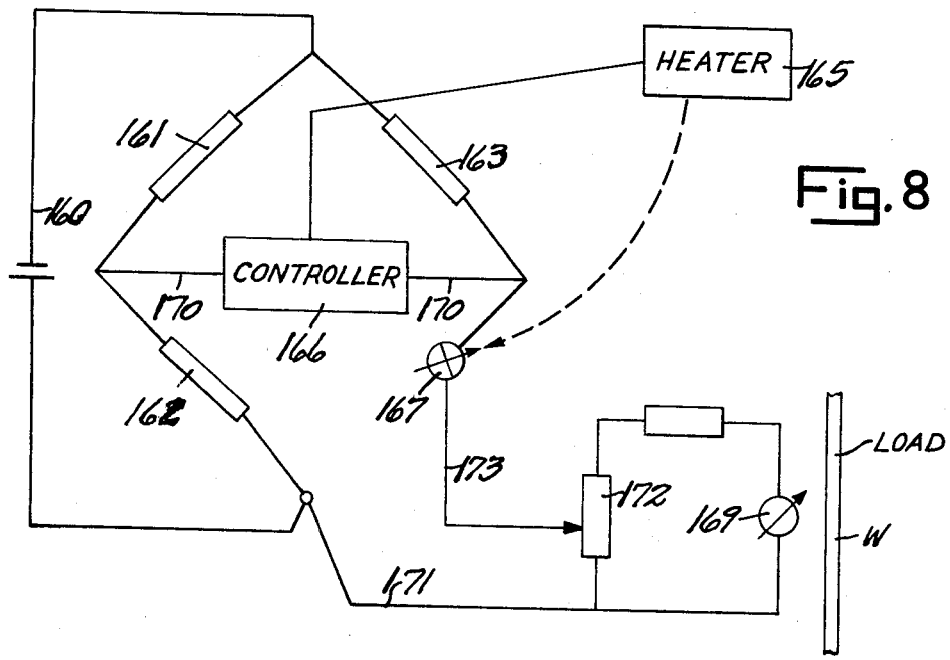
FIG. 8 is a wiring diagram of an embodiment of the device utilizing the temperature compensating means of FIG. 7.

A wiring diagram is illustrated in FIG. 8 which utilizes the arrangement illustrated in FIG. 7. In this circuit, which has a separate bridge circuit for temperature control, resistors 161 and 162 are connected in two adjacent legs of a bridge to opposite terminals of which the bridge voltage or supply circuit 160 is connected. The other two legs of the bridge include a fixed resistor 163 in one leg, and the sensors 167 and 169 in the other leg. Controller 166 is connected in a lead 170 connected across the terminals opposite those to which the supply circuit 160 is connected, and controls the functioning of the heater 165. The leg of the bridge in which the resistors 167 and 169 are connected preferably includes a lead 171 in which the sensor 169 is connected and which leads to a potentiometer 172. The contactor of the potentiometer is connected by lead 173 with the sensor 167 which responds to the temperature of the heater 165. The close coupling of parts which is equivalent to insulation 168, as described re FIG. 5, is utilized.

The favorable or desired temperature pattern on the load, as shown at C in FIG. 6, is obtained by this circuit. This is important in various installations or uses. Thus, in the plastic extrusion industry sheet temperatures may be substantially higher than ambient temperatures and can vary with thickness of the work at the point of gauging.

Figure 9:
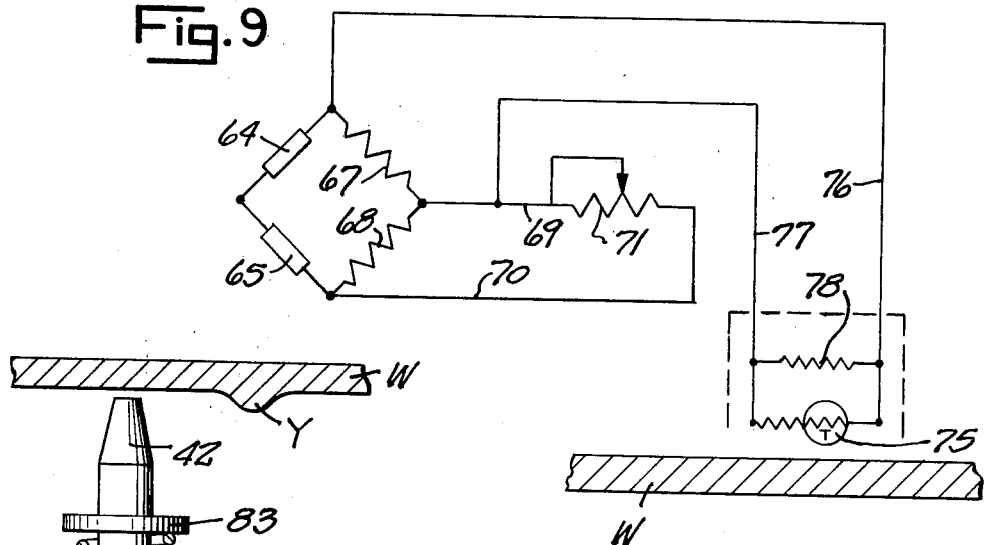
FIG. 9 is a wiring diagram of an embodiment of the device utilizing another temperature compensating means.

In some instances, to compensate for changes in sheet temperature, a thermistor network may be positioned closely above the sheet at the point of gauging. Such an arrangement is illustrated in the circuit shown in FIG. 9 utilizing a Wheatstone bridge arrangement similar to that illustrated in FIG. 3. In this arrangement, the thermistor 75 positioned closely adjacent the work W is connected by lead 76 to the junction of the bridge between the resistors 64 and 67 while lead 77 is connected to the junction between the resistors 67 and 68. A fixed resistor 78 may be connected between leads 76 and 77 in the measuring unit in parallel to thermistor 75.

Figure 10:
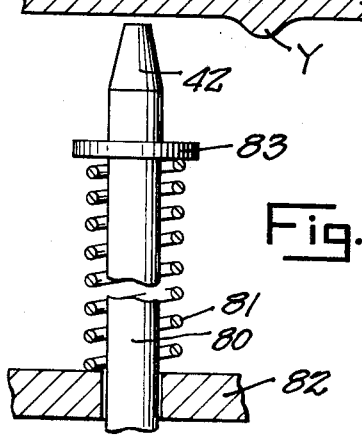
FIG. 10 is a detail view illustrating a modified construction of nozzle mount.

In devices of this character, it is usual to position the nozzles with their discharge orifices or tips quite close to the surface of the work W. Accordingly, if a substantial irregularity or projection exists in the area of the work which is being gauged, as illustrated at Y in FIG. 10, the projection Y may contact the tip of the nozzle, such as the nozzle 42. This can result in injury to the work W or in reduction of the effectiveness of the measuring device. Accordingly, it is desirable to provide in a device of this character some means by which the nozzle is held normally in a selected position, but can shift from that position momentarily if it engages an obstacle. In the construction shown in FIG. 10, the nozzle 42 is connected to a flexible tubular part or air line 80 mounted on piston rod 41. Flexible tube 80 is encircled by a coil spring 81 bearing against abutments at 82 and 83 on the nozzle and on a part shiftable with the nozzle, such as member 53.

By this construction, the spring 81 serves normally to position the nozzle at a selected location and to hold it in selected orientation to the work. However, should the tip of the nozzle encounter a projection Y on the work, the nozzle can shift momentarily by virtue of the flexibility of the coil spring 81 and of the nozzle supply tube 80 to accommodate passage of the obstacle Y without injury to the apparatus. As soon as the obstacle Y disengages the nozzle 42, the spring restores the nozzle to its normal or prior operating condition.

Figure 11:
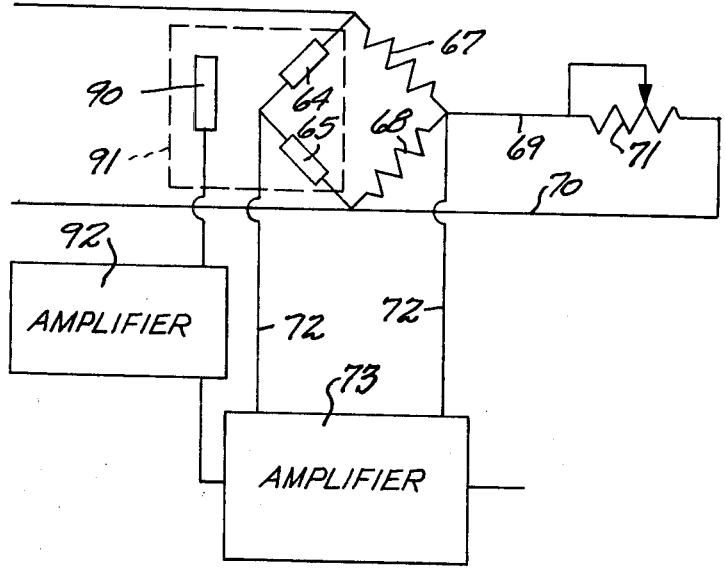
FIG. 11 is a wiring diagram of a device utilizing means for compensating for stray magnetic fields.

Stray magnetic flux fields may occur which affect the accuracy of the device, as when the apparatus is located at different positions across the work piece or sheet being measured. In order to compensate for such stray magnetic flux fields, an arrangement may be utilized as illustrated in FIG. 11 wherein a probe 90 or sensor responsive to stray magnetic flux is employed. This probe should preferably be physically located adjacent to the active flux-sensitive resistor 64 and the temperature-compensating resistor 65, as indicated schematically by the dotted lines 91 in FIG. 11. The signals detected by the probe 90 as a result of the presence of stray magnetic flux fields are delivered to and amplified by an amplifier 92, and the resulting amplified signal is delivered to the amplifier 73 to compensate or modify the output of amplifier 73 to the signals received from the Wheatstone bridge circuit. The circuit in FIG. 11 is otherwise similar to the circuit in FIG. 3.

Figure 12:
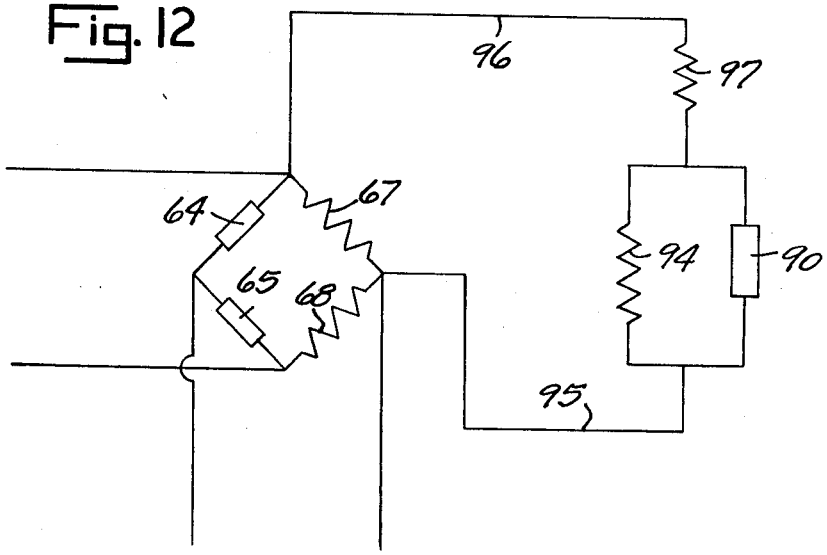
FIG. 12 is another circuit illustrating compensation for stray magnetic flux.

Another manner of use of a stray magnetic flux field probe or detector 90 is illustrated in FIG. 12, wherein probe 90 is connected in parallel with a resistor 94 and is connected to the Wheatstone bridge circuit between resistances 67 and 68 by a lead 95, and is connected to the Wheatstone bridge circuit between the resistors 64 and 67 by a lead 96, including a resistance 97. Thus the probe is connected in the bridge circuit in shunt relation to resistor 67.

The circuits of FIGS. 11 and 12 provide effective compensation for stray magnetic flux fields sensed by a probe 90 which is physically located adjacent the magnetic circuit in the region of constant temperature, that is in a region having thermal coupling with resistors 64 and 65.

While the preferred embodiments of the invention have been illustrated and described, it will be understood that changes may be made without departing from the invention.

What we claim is:

1. In a device for measuring the thickness of a nonmagnetic work piece and having follower means shiftable to maintain a selected spacing from one surface of said work piece, magnetically responsive means carried by said follower means, a second follower shiftable to maintain a selected spacing from the opposite surface of said work piece, magnet means carried by said second follower means for magnetically influencing said magnetically responsive means whereby magnetic flux in the responsive means is changed proportionally to variations in the space between the magnet means and the magnet responsive means occurring with changes in the thickness of said work, said magnet means having pole faces confronting said work piece, the improvement wherein said magnetically responsive means constitutes a pair of spaced magnetically susceptible parts having faces confronting said work piece and a third magnetically susceptible part smaller than said spaced parts and positioned therebetween, said spaced parts and third part cooperating with said magnet means to define a magnetic circuit in which magnetic flux is concentrated at said third part, a flux sensor carried by said third part electrical measuring means responsive to said sensor, and means for compensating for the effects of stray magnetic fields on the sensor including a stray magnetic flux sensitive means connected to said electrical measuring means to modify the output of said electrical measuring means responsive to said sensor.

2. The combination defined in claim 1, wherein said measuring means is a Wheatstone bridge measuring circuit responsive to and including said sensor.

3. A thickness measuring device comprising magnet means located at a selected distance from one face of a non-magnetic work piece, follower means positioned at a selected distance from the opposite face of said work piece, magnetically responsive means carried by said follower means and influenced by said magnet means to vary the flux intensity in said responsive means as variations in the thickness of the work piece occur, said magnetically responsive means including a pair of spaced magnetically susceptible members and a third magnetically susceptible member between and smaller than the members of said pair, said magnet means and said magnetically responsive members defining a magnetic circuit in which flux is concentrated at said third member, a resistor responsive to the flux in said third member, electrical measuring means responsive to said resistor, and means for compensation of the effects of stray magnetic fields on the resistor including a stray magnetic flux sensitive sensor connected to said electrical measuring means to modify the output of said electrical measuring means responsive to said resistor.

4. A device as defined in claim 3, wherein said pair of magnetically susceptible members located adjacent said work have surfaces adjacent said work piece of larger area than surfaces of said magnet means located adjacent said work.

5. A device as defined in claim 1, and means for maintaining at least part of said magnetically responsive means at substantially constant temperature.

6. A device as defined in claim 1, and means for heating at least part of said magnetically responsive means, a temperature sensing means adjacent said heating means, and means responsive to said sensing means and controlling said heating means.

7. A device as defined in claim 1, and means for heating at least part of said magnetically responsive means, means sensing the temperature of said magnetically responsive means, means sensing ambient temperature, and means responsive to both of said sensing means for controlling said heating means.

8. A device as defined in claim 3, wherein said measuring means includes a Wheatstone bridge circuit, and a temperature compensating resistor, said bridge circuit including said flux responsive resistor and said temperature compensating resistor.

9. A device as defined in claim 3, wherein said measuring means includes a Wheatstone bridge circuit, a temperature compensating resistor adjacent said magnetically responsive means, and a resistor adjacent to the work piece and responsive to the temperature thereof, said flux responsive resistor, temperature compensating resistor and work temperature responsive resistor being connected in said bridge circuit.

10. A device as defined in claim 1, wherein pneumatic means control the positions of said respective follower means, said pneumatic means including nozzles located adjacent to and discharging air under pressure against opposite surfaces of the work piece and means positioning said nozzles and including resilient parts accommodating lateral deviation of the nozzles from selected positions and return thereof to selected positions.

\* \* \* \* \*